United States Patent [19]

Michot

[11] Patent Number: 4,860,980

[45] Date of Patent: Aug. 29, 1989

[54] CONNECTOR HOLDER

[75] Inventor: Alain F. Michot, Cary, N.C.

[73] Assignee: Northern Telecom Limited, Montreal, Canada

[21] Appl. No.: 212,794

[22] Filed: Jun. 29, 1988

[51] Int. Cl.$^4$ ............................................. F16L 3/10
[52] U.S. Cl. ................................... 248/74.4; 24/504
[58] Field of Search ...................... 248/74.4, 74.1, 56, 248/229 R, 63, 64, 316.3, 520, 538; 24/500, 504, 505, 510, 490, 492

[56] References Cited

U.S. PATENT DOCUMENTS

| | | | |
|---|---|---|---|
| 315,495 | 4/1885 | Goettel | 24/492 X |
| 1,289,995 | 12/1918 | Wrage | 248/74.1 X |
| 3,792,829 | 2/1974 | Fickeh | 248/316.3 X |
| 4,213,589 | 7/1980 | Pierron et al. | 248/74.1 |
| 4,436,266 | 3/1984 | Gerding | 248/74.1 |

FOREIGN PATENT DOCUMENTS

| | | | |
|---|---|---|---|
| 396098 | 3/1975 | Netherlands | 248/74.1 |
| 1033865 | 6/1966 | United Kingdom | 24/510 |

Primary Examiner—Ramon S. Britts
Assistant Examiner—Karen J. Chotkowski
Attorney, Agent, or Firm—Foley & Lardner, Schwartz, Jeffery, Schwaab, Mack, Blumenthal & Evans

[57] ABSTRACT

A latching device used to fasten a cable or a similar item to another surface is equipped with a spring-loaded, adjustable locking section. By using one motion, the item can be inserted and secured. As the connector is inserted in the receptacle, the locking section automatically rotates into place thereby retaining the receptacle. The connector can be released by unlocking a lever.

12 Claims, 3 Drawing Sheets

CONNECTOR HOLDER

This invention relates to connector or cable holders, but more particularly, this invention relates to latching devices used to fasten a cable or a similar item to another surface.

Telecommunications equipment such as switches and peripheral equipment, often have to be transported and placed at remote locations for offering temporary telecommunications services. This equipment is provided with power cables and connectors of sufficient length to allow connection to a power source. These relatively large cables and connectors, had in the past the inherent problem of being unsecured in the transportation vehicle used to carry the equipment to a remote site. This transportation vehicle can either be a truck or helicopter or any suitable means of transporting the equipment to that site.

The connectors and cables when left unsecured can be hazardous if the equipment is subjected to sudden movement. Although the switching equipment itself is secured, these cables have the tendency to shift and move within the transportation vehicle with the possible risk of damaging nearby equipment or instruments or even a nearby operator.

Accordingly, a requirement exists for a latching device capable of fastening a cable or connector or similar item to another surface and which can be used relatively easily and thereby allow easy fastening and removal of the cable and connector.

Accordingly, it is an object of the present invention to provide a latching device used for fastening large power cable connectors, comprising: a securing frame having receptacle means for receiving said connector; a retaining member for retaining said connector in said receptacle means, said member being mounted to said frame at a pivot point, rotatable about said point between a latched and an unlatched position, said member having: (a) a first end forming a retaining section when said member rotates to a latched position; (b) a second end, opposite said first, extending over said receptacle means when said retaining member is in said unlatched position, said second end forming a latching actuator such that when said connector is inserted in said receptacle means, said connector will abut said second end and rotate said member about said pivot point to a latched position; and locking means adapted to secure said retaining member in said latched position.

Particular embodiments of the invention will be understood in conjunction with the accompanying drawings in which:

FIG. 3b is a sectional view taken along lines 3b—3b of FIG. 3a.

Figure 1:
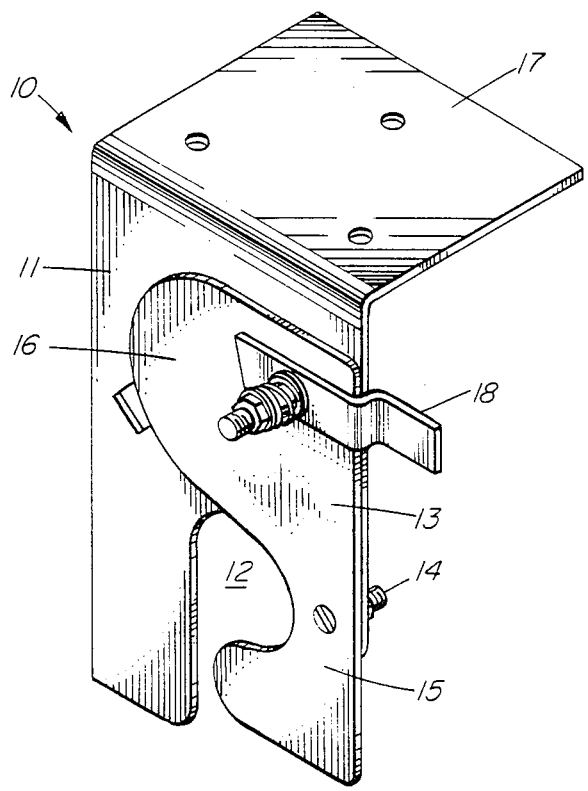
FIG. 1 is an isometric front view of the latching device of the present invention.

Referring now to FIG. 1, we have shown generally at reference numeral 10 an illustrative isometric view of the latching device of the present invention. The latching device is basically comprised of a securing frame 11 having a receptacle 12 for receiving a large power connector. A retaining member 13 is used for retaining the connector in receptacle 12. Retaining member 13 is pivotably mounted to securing frame 11 at pivot point 14. This allows retaining member 13 to pivot between a latched and an unlatched position. Retaining member 13 is shown in FIG. 1 in its latched position. The first end 15 of retaining member 13 forms a retaining section when the member rotates to a latched position as shown in FIG. 1. The second end 16 extends over receptacle 12 when the retaining member 13 is in the unlatched position. The second end forms a latching actuator such that when the connector is inserted in the receptacle 12, the connector will abut the second end 16 and rotate the retaining actuator 13 about pivot point 14 to a latched position. Securing frame 11 is provided with a mounting plate 17 allowing the frame to be securely mounted.

A locking bracket 18 is provided to secure retaining member 13 in the latched position.

Figure 2A:
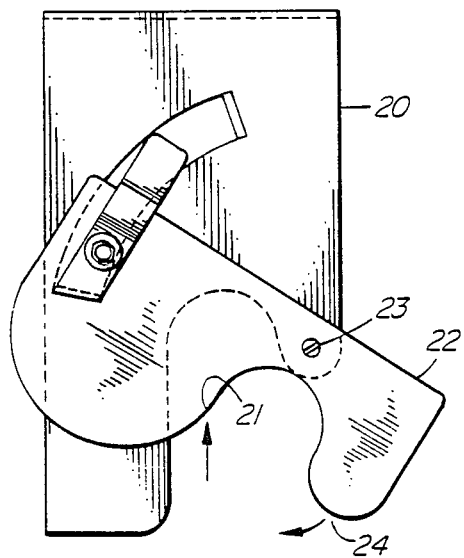
FIGS. 2a to 2d are front views of the latching device illustrating the latching action.
Figure 2B:
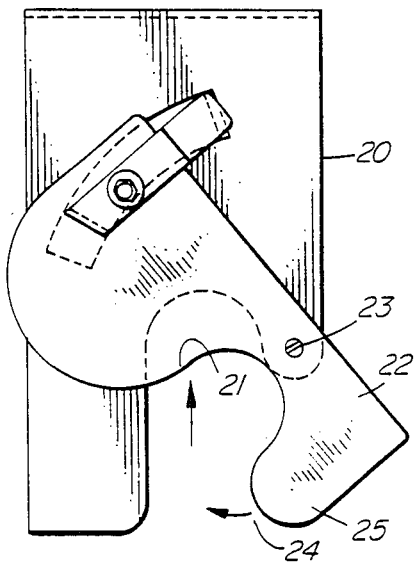
Figure 2C:
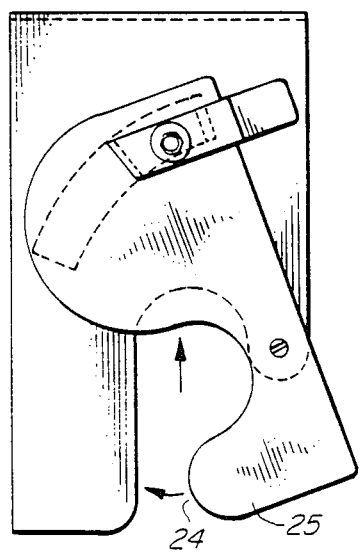
Figure 2D:
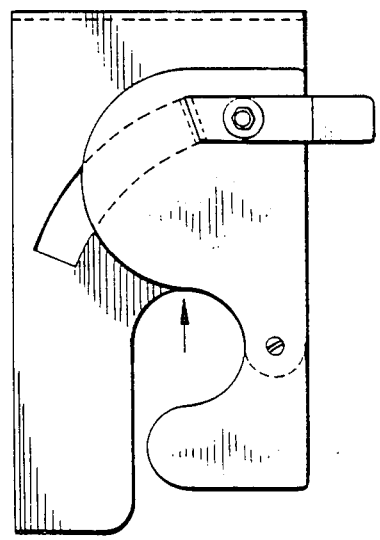

Referring now to FIGS. 2a through to 2d, we have shown a series of figures illustrating the movement of the retaining member between an unlatched position in FIG. 2a and a latched position in FIG. 2d.

Referring to FIG. 2a, as a connector is inserted in the receptacle of securing frame 20, the connector will abut with an inner edge 21 of retaining member 22 thereby forcing the retaining member to pivot about point 23 in a direction shown by arrow 24.

As retaining member 22 rotates in the direction shown by arrow 24, the first end thereof or retaining section 25 will move over the receptacle entrance to close the receptacle and prevent movement of a connector as is shown in FIG. 2d.

Figure 3A:
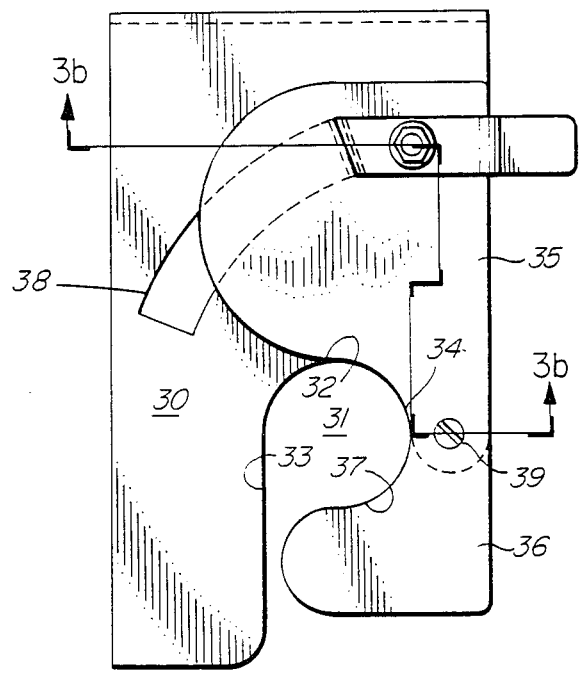
FIG. 3a is a front view of the latching device.

Referring now to FIG. 3a, we have shown a front view of the securing frame of the latching device of the present invention. The receptacle 31 of securing frame 30 basically comprises an open ended slot extending along the securing frame. The slot 31 is provided with a curvilinear receiving end 32, a first side edge 33 and a second side edge 34. The curvilinear receiving end 32 is adapted to mate with the power or cable to be secured.

The first end 36 of retaining member 35 has an inner side edge 37 which extends over the open end of slot 31 to retain the connector in the receptacle when the retaining member 35 is in a latched position as shown in FIG. 3a. The inner side edge 37 is similarly curvilinear such that the first end 36 can mate with the connector when abutted thereon.

Figure 3B:
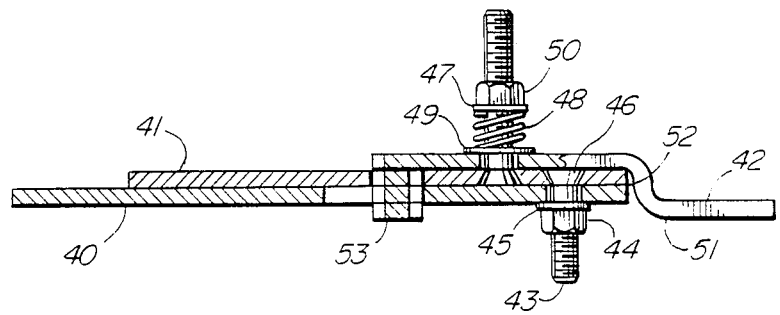

A guiding slot 38 is provided to guide retaining member 35 as it rotates about pivot point 39 as more clearly shown in FIG. 3b. In FIG. 3b, the securing frame is depicted at reference numeral 40, retaining member at reference numeral 41 and the locking bracket at reference numeral 42. Retaining member 41 is pivotably mounted onto securing frame 40 by means of a pivot pin 43 which can be comprised of a threaded fastener secured to frame 40 by means of a threaded nut 44. Threaded fastener 43 extends through an aperture 45 of securing frame 40 and ends at aperture 46 of retaining member 41.

The locking bracket 42 is moveably mounted on a retaining pin 47 secured onto retaining member 41. The locking bracket 42 is held against retaining member 41 by means of a spring 48 and washer 49. A lock nut 50 secures spring 48 onto retaining pin 47.

The locking bracket 42 is provided with a retaining edge 51 adapted to be held against the outer side edge 52 of the securing frame 40. In operation, as the cable or connector is pressed into the receptacle, the retaining member 41 automatically rotates into a latched position and locking bracket 42 snaps into place against the outer side edge 52 of securing frame 40. To release the cable, the locking bracket 42 is lifted to allow rotation of retaining member 41 into the unlatched position.

A guiding edge 53 is provided at the opposite end of locking bracket 42 and is adapted to slide along guiding slot 38 shown in FIG. 3a. The guiding edge 53 limits the amount of travel of the retaining member when moved from an unlatched to a latched position.

What is claimed is:

1. A latching device used for fastening large power cable connectors, comprising:

a securing frame having receptacle means for receiving said connector;

said securing frame defining an arcuate guide slot therein;

a retaining member for retaining said connector in said receptacle means, said member being mounted to said frame at a pivot point, rotatable about said point between a latched and an unlatched position, said member having:

(a) a first end forming a retaining section when said member rotates to a latched position;

(b) a second end, opposite said first end, extending over said receptacle means when said retaining member is in said unlatched position, said second end forming a latching actuator such that when said connector is inserted in said receptacle means, said connector will abut said second end and rotate said member about said pivot point to a latched position; and locking means moveably mounted to said retaining member;

said locking means being adapted to secure said retaining member in said latched position;

said locking means having a guiding portion adapted to slide within said arcuate guide slot.

2. A latching device as defined in claim 1 wherein said receptacle means comprises an open ended slot extending along said securing frame.

3. A latching device as defined in claim 2 wherein said slot has a first and second side edge and a curvilinear receiving end for mating with said connector.

4. A latching device as defined in claim 3 wherein said first end has an inner side edge which extends over said open end of said slot to retain said connector in said receptacle when said member is in a latched position.

5. A latching device as defined in claim 4 wherein said inner side edge is curvilinear such that said first end can mate with said connector when abutting thereon.

6. A latching device as defined in claim 5 wherein said pivot point is positioned on said retaining member at a point between said first and second end.

7. A latching device as defined in claim 6 wherein said pivot point is positioned on said securing frame at a point on one of said first and second side edge.

8. A latching device as defined in claim 7 wherein said second end has an inner curvilinear side edge extending the inner side edge of said first end.

9. A latching device as defined in claim 8 wherein said locking means is mounted to said retaining member and is adapted to be latched to said securing frame at an outer side edge thereof.

10. A latching device as defined in claim 9 wherein said locking means comprises a bracket moveably mounted on a retaining pin secured to said retaining member, said bracket having a retaining edge adapted to be held against said outer side edge of said securing frame, said bracket being retained on said pin by spring means such that as said retaining member rotates to a latched position, said bracket will rotate therewith and said retaining edge will snap on said outer side edge to lock said retaining member thereto.

11. The latching device as defined in claim 1, wherein said arcuate guide slot has a center of curvature at said pivot point.

12. The latching device as defined in claim 1, wherein said securing frame, said retaining member and said lock means are substantially planar and parallel to each other along principal portions thereof.

* * * * *